United States Patent [19]
Miller

[11] Patent Number: 5,493,636
[45] Date of Patent: Feb. 20, 1996

[54] SYSTEM AND METHOD FOR SHADING GRAPHIC IMAGES USING AN ACCESSIBILITY FACTOR TO SIMULATE TARNISH ACCUMULATION FOR REALISTIC RENDERING

[75] Inventor: Gavin S. P. Miller, Palo Alto, Calif.

[73] Assignee: Apple Computer, Inc., Cupertino, Calif.

[21] Appl. No.: 121,729

[22] Filed: Sep. 15, 1993

[51] Int. Cl.⁶ .................................................. G06T 15/50
[52] U.S. Cl. ........................ 395/126; 395/129; 395/132
[58] Field of Search ................................... 395/118, 126, 395/129, 130–132, 135

[56] References Cited

PUBLICATIONS

Foley et al., "Computer Graphics Principles and Practice", Addison–Wesley, 1990.
Leslie A. Kuhn, et al., "The Interdependence of Protein Surface Topography and Bound Water Molecules Revealed by Surface Accessibility and Fractal Density Measures", 1992, pp.13–22.
Michael L. Connolly, "Solvent–Accessible Surfaces of Proteins and Nucleic Acids", Aug. 1983, vol. 221, No.. 4612, pp. 709–713.
M. L. Connolly, "Measurement of Protein surface Shape by Solid Angles", Mar. 1986, vol. 4, No. 4.
Frederic M. Richards, "Packing Defects Cavities, Volume Fluctuations, And Access To The Interior Of Proteins. Including Some General Comments On Surface Area and Protein Structure," 1979, vol. 44, pp. 47–63.

*Primary Examiner*—Heather R. Herndon
*Assistant Examiner*—Paul Roberts
*Attorney, Agent, or Firm*—Greg T. Sueoka

[57] ABSTRACT

A system for shading graphic images for realistic rendering representative of tarnish accumulation has a display device, a central processing unit, an input device, and a memory means. The memory includes image components, shading routines, accessibility routines, display routines, and a texture map. The system modifies each image prior to display to apply shading. The system uses the accessibility routines to produce an accessibility factor for each pixel in the image. The accessibility factor is then used by the display routines to apply the desired shading to each pixel as it is rendered on the display device. A method for producing an accessibility factor and determining the amount of shading applied to a pixel includes the steps of: identifying a surface and point corresponding to the pixel; identifying another object that affects the accessibility; determining the type of the other object; calculating the radius of a sphere tangent to both the point and the object; and setting the accessibility factor equal to the radius of the sphere. This process is then repeated for each object in the image. The minimum accessibility factor for all tested objects is determined, and then used by the present invention to apply the appropriate amount of shading to the pixel when it is rendered.

32 Claims, 14 Drawing Sheets

SYSTEM AND METHOD FOR SHADING GRAPHIC IMAGES USING AN ACCESSIBILITY FACTOR TO SIMULATE TARNISH ACCUMULATION FOR REALISTIC RENDERING

BACKGROUND OF THE INVENTION

1. Field of the Invention

The present invention relates generally to methods for producing graphical images on computers and computer modeling. In particular, the present invention relates to a system and method for applying shading to a computer generated graphic image for more realistically modeling objects. Still more particularly, the present invention relates to the production and use of an accessibility factor for applying shading when rendering each pixel of an image.

2. Description of the Related Art

Computer graphics and systems have become well known. Every image generated by such computer systems comprises thousands of pixels. Each pixel is selectively illuminated with various degrees of intensity and color to produce graphical images. The ability of computers to generate such images has become useful in a variety of applications and computer modeling techniques. One continuing problem in the area of computer graphics has been producing an image of an object that matches the item's appearance in the real world. Often computer generated images are readily recognized as such because they do not realistically depict the real world object. Typically, objects that are modeled by computers have a new, clean and sterile appearance that lacks surface texture or other effects that come with the aging of an object. It continues to be very difficult to model objects with an aged appearance.

One prior art approach to eliminate this problem and to provide computer graphics with more flexibility for representing objects has been the application of surface texture and shadowing. Texture has been applied to surfaces in a number of ways. For example, surface texture has been applied using parametric surface textures, using a pre-filtering pyramid for anti-aliasing, and using solid textures based on the position of a surface element. Various illumination methods have also been used on images to help obtain realistic soft shadows. However, these prior art approaches are often rendered such that they are dependent on the view of the object being displayed and the positioning of light sources. This is problematic because the surface texture and shading are continually being reproduced as views of the model changes, and each production of surface texture and shadowing requires a significant amount of computational resources.

Another prior art approach is disclosed by Saito and Takahashi in "Comprehensible Rendering of 3-D Shapes," *Computer Graphics*, August 1990, pp. 197–206. Saito and Takahashi disclose a process of finding lines of slope discontinuities that are a single pixel wide. These lines are then used to enhance the rendering of the image. While this method is useful for intelligible rendering, it cannot be used to provide a smoothly varying estimate of the accessibility of the surface regions of an object. Moreover, like the other prior art solutions, the lines must be recalculated for each new view of a scene. The line discontinuities do not have a global application that can be used for all shading.

Other prior art approaches to realistic rendering are disclosed in the context of molecular modeling. For example, a solvent molecule has been described as a sphere of some fixed radius and then the solvent-accessible surface defined as the boundary of the volume that could be occupied by the sphere without penetrating the molecule. In the case of a molecular model made just of spheres, the solvent accessible surface is made up of pieces of spheres and tori. (See Lee and Richards, "The Interpretation Of Protein Structures: Estimation Of Static Accessibility," *Journal of Molecular Biology*, 1977, p. 151.) Another prior art approach provides a measure of surface convexity. It is computed by placing a sphere center on the molecular surface point, and then computing the fraction of the sphere's area which is contained within the molecular surface. (See Connolly, "Measurement Of Protein Surface Shape By Solid Angles," *Journal of Molecular Graphics*, 1986.) Yet another prior art approach defines surface accessibility as the radius of the largest sphere which may touch the surface tangentially and not intersect other surfaces. (See Kuhn et al., "The Interdependence Of Protein Surface Topography And Bound Water Molecules Revealed By Surface Accessibility And Fractal Density Measures," *Journal of Molecular Biology*, 1992, pp. 13–22.) While these methods may be used to provide more realistic rendering of images, they are still problematic in several respects. Because the methods were originated in the context of molecular modeling, they provide accessibility of only a sphere in the presence of another sphere, and therefore, do not provide a basis for effectively modeling all shape types and determining the accessibility for each. Moreover, determining accessibility as defined by the prior art is also very taxing on computer resources. Accessibility computations require large amounts of processing power and can adversely effect the overall performance of the system for other operations. Thus, there is a need for a method of determining accessibility that does not adversely affect computer performance.

Therefore, there is a need for a system and method for effectively producing images that realistically show aging, in particular, the accumulation of dirt and other foreign matter upon objects. Moreover, there is a need for a system and method that efficiently produce and render such images on a display device.

SUMMARY OF THE INVENTION

The present invention overcomes the limitations and shortcomings of the prior art with a system and method for shading graphic images for realistic rendering representative of tarnish accumulation. The system of the present invention advantageously includes a display device, a central processing unit, an input device, a printer/hard copy device, a memory means, and a data storage device. These components are preferably coupled together by a bus. The memory further comprises image components, shading routines, accessibility routines, display routines, and a texture map. The system of the present invention uses the operating system and image components to display an image of one or more objects on the display device. The images are computer graphic models of real world objects. The present invention modifies each image prior to display to apply shading. The present invention preferably uses the accessibility routines to produce an accessibility factor for each pixel in the image. The accessibility factor is then used by the display routines to apply the desired shading to each pixel as it is rendered on the display device. The present invention also stores each of the accessibility factors into a texture map. Once all the factors in the map have been produced, shading can be easily and quickly applied to any images including the objects by reading the appropriate accessibility factors from the texture map. The time and resources necessary to re-compute accessibility are thereby eliminated.

The present invention also comprises a method for producing an accessibility factor that in turn is used to determine the amount of shading applied to a pixel. The preferred method begins by producing an accessibility factor between a particular point corresponding to a pixel and another object in the image. This method preferably comprises the steps of: identifying the surface and point corresponding to the pixel; identifying another object that affects the accessibility; determining the type of the other object; calculating the radius of a sphere tangent to both the point and the object; and setting the accessibility factor equal to the radius of the tangential sphere. This process is then repeated for each object in the image. The minimum accessibility factor found is then used by the present invention to apply the appropriate amount of shading to the pixel when it is rendered. The present invention also includes a method for optimizing the determination of the accessibility factor. The optimization method simplifies the process for determining accessibility by defining a sloppy bound that includes all objects in the proximity of the point of interest. Only the objects that intersect with the sloppy bound are then used to determined accessibility for the next adjacent pixel.

DETAILED DESCRIPTION OF THE PREFERRED EMBODIMENT

The present invention involves creating and computing a new scalar value referred to here as "accessibility" for each visible pixel in a computer graphics image. The present invention defines accessibility as the degree to which a surface element may be accessed by a tangential sphere touching the surface. The present invention produces an accessibility factor for each visible pixel and uses the accessibility factor to shade the image such that surface concavities and intersections are highlighted. The shading of the present invention may be used either for diagrammatic purposes, to make the shape easier to understand, or to simulate the accumulation of dirt, tarnish, or foreign matter for realistic rendering.

Figure 1:
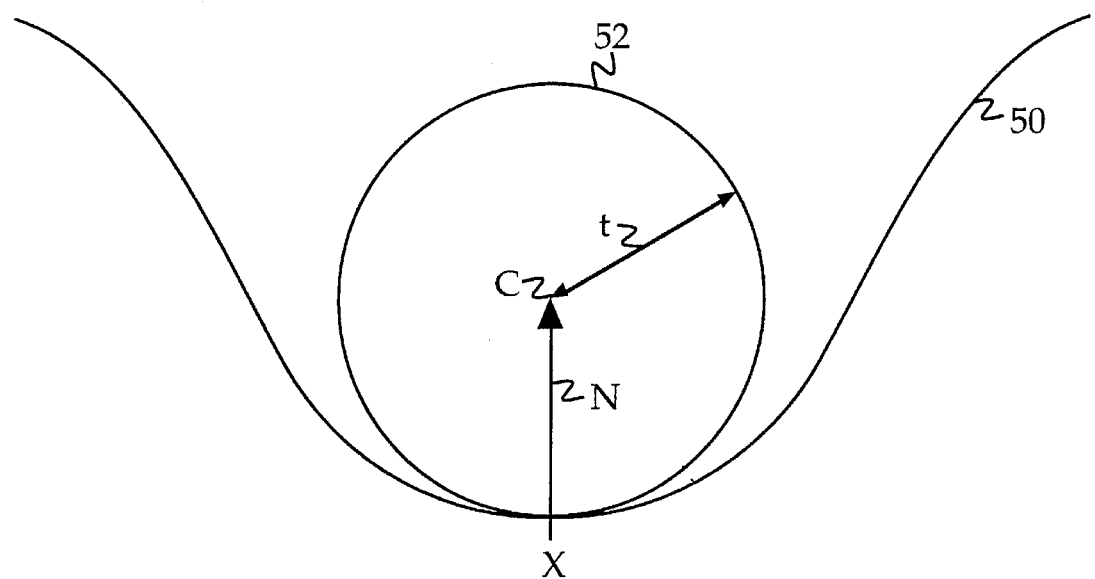
FIG. 1 is a diagram of a surface and a tangential sphere used by the present invention to determine the accessibility of a point X along the surface.

FIG. 1 illustrates a diagram of how the accessibility factor is determined generally. The diagram shows a surface 50 represented by a curve with a point X on the surface 50 corresponding to a pixel to be displayed. A tangential sphere 52, represented by a circle, is formed at point X on the surface 50. The present invention advantageously defines the accessibility factor for point X as the radius of the largest sphere 52 that may touch the point X tangentially and does not intersect with the surface 50 upon which the point lies or any other surfaces (not shown). For the surface 50, the accessibility factor at point X is t, the radius of sphere 52.

Figure 2:
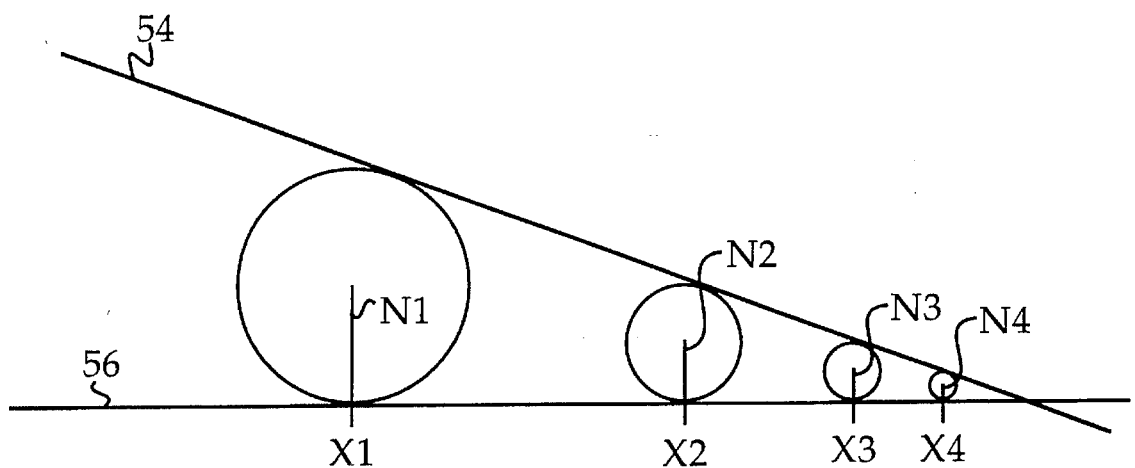
FIG. 2 is a diagram of two surfaces and a plurality of tangential spheres used by the present invention to determine the accessibility at respective points along the surfaces.

Referring now to FIG. 2, the effect of multiple surfaces 54, 56 on the accessibility factor is shown. FIG. 2 illustrates a determination of the accessibility factor at four points, $X_1$, $X_2$, $X_3$, and $X_4$, on the surface 56. Again, the accessibility factor $N_1$, $N_2$, $N_3$, and $N_4$, at each point, $X_1$, $X_2$, $X_3$, and $X_4$, respectively, is determined by the same rule, namely the accessibility factor is equal to the radius of the largest possible sphere that touches the point tangentially and does not intersect with the surface 56 upon which the point lies or any other surfaces 54. In contrast to the case illustrated in FIG. 1, the accessibility factor $N_1$, $N_2$, $N_3$, and $N_4$, for each point $X_1$, $X_2$, $X_3$, and $X_4$, respectively, in FIG. 2 is set by the intersection of the sphere with the other surface 54. The accessibility factor for each point successively decreases as the points are closer to the intersection of the two surfaces 54, 56. Thus, this scalar value can be used to properly identify and accurately render areas of computer models that are of significance. For example, concave hollows are less accessible as are discontinuous intersections between surfaces.

Figure 3:
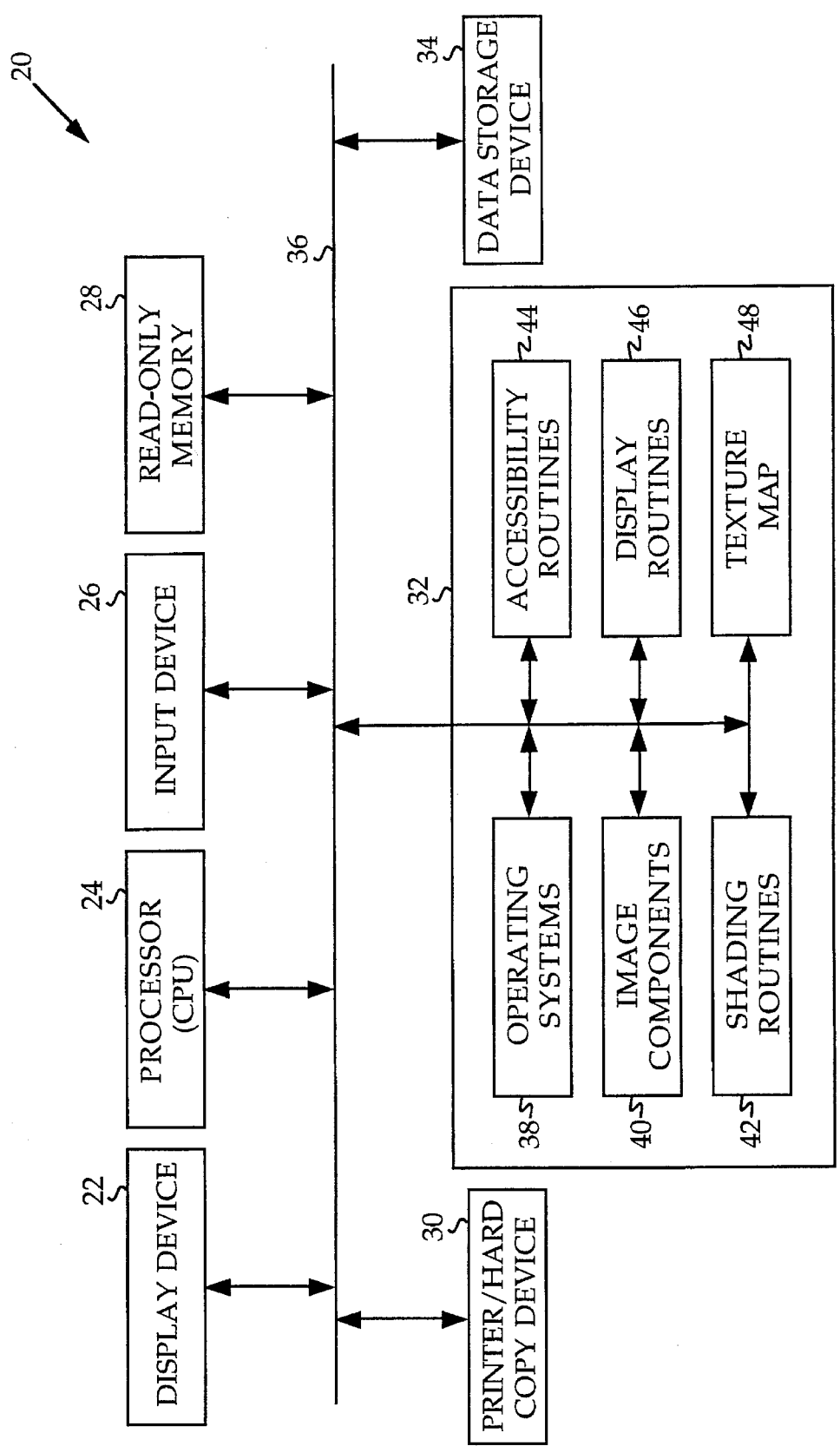
FIG. 3 is a block diagram of a preferred embodiment for the computer system for shading graphic images of the present invention.

Referring now to FIG. 3, a block diagram of a preferred embodiment of a system 20 constructed in accordance with the present invention is shown. The system 20 preferably comprises a display device 22, a central processing unit (CPU) 24, an input device 26, a read only memory (ROM) 28, a printer/hard copy device 30, a memory means 32, and a data storage device 34. The CPU 24 is connected by a bus 36 to the display device 22, the input device 26, ROM 28, and the memory means 32. The CPU 24, the display device 22, input device 26, and memory 28, 32 may be coupled in a conventional manner such as a personal computer. The CPU 24 is preferably a microprocessor such as an Motorola 68040 or Intel 486; the display device 22 is preferably a video monitor; and the input device 26 is preferably a keyboard and mouse type controller. The CPU 24 is also coupled to the hard copy device 30 such as a laser printer, and the data storage device 34 such as a hard disk drive in a conventional manner.

The memory means 32 further comprises an operating system 38, image components 40, shading routines 42, accessibility routines 44, display routines 46, and a texture map 48. The system 20 of the present invention uses the operating system 38, image components 40, and display routines 46 in a conventional manner to display an image of one or more objects on the display device 22. However, the images are preferably computer graphic models of real world objects. The present invention modifies each image prior to display by applying shading using the accessibility factor of the present invention. The accessibility factor is determined by the accessibility routines 44 for each portion of the image component to be displayed. In the preferred embodiment, the accessibility factor for each point on the image is calculated once and then stored in the parametric texture map 48 for re-use if the point of view or lighting for the image is modified. Once the accessibility factor for each point of the components that form a pixel are determined, the shading routines 42 are used to apply shading to the image. The image is then displayed using the display routines 46 on the display device 22.

Figure 4:
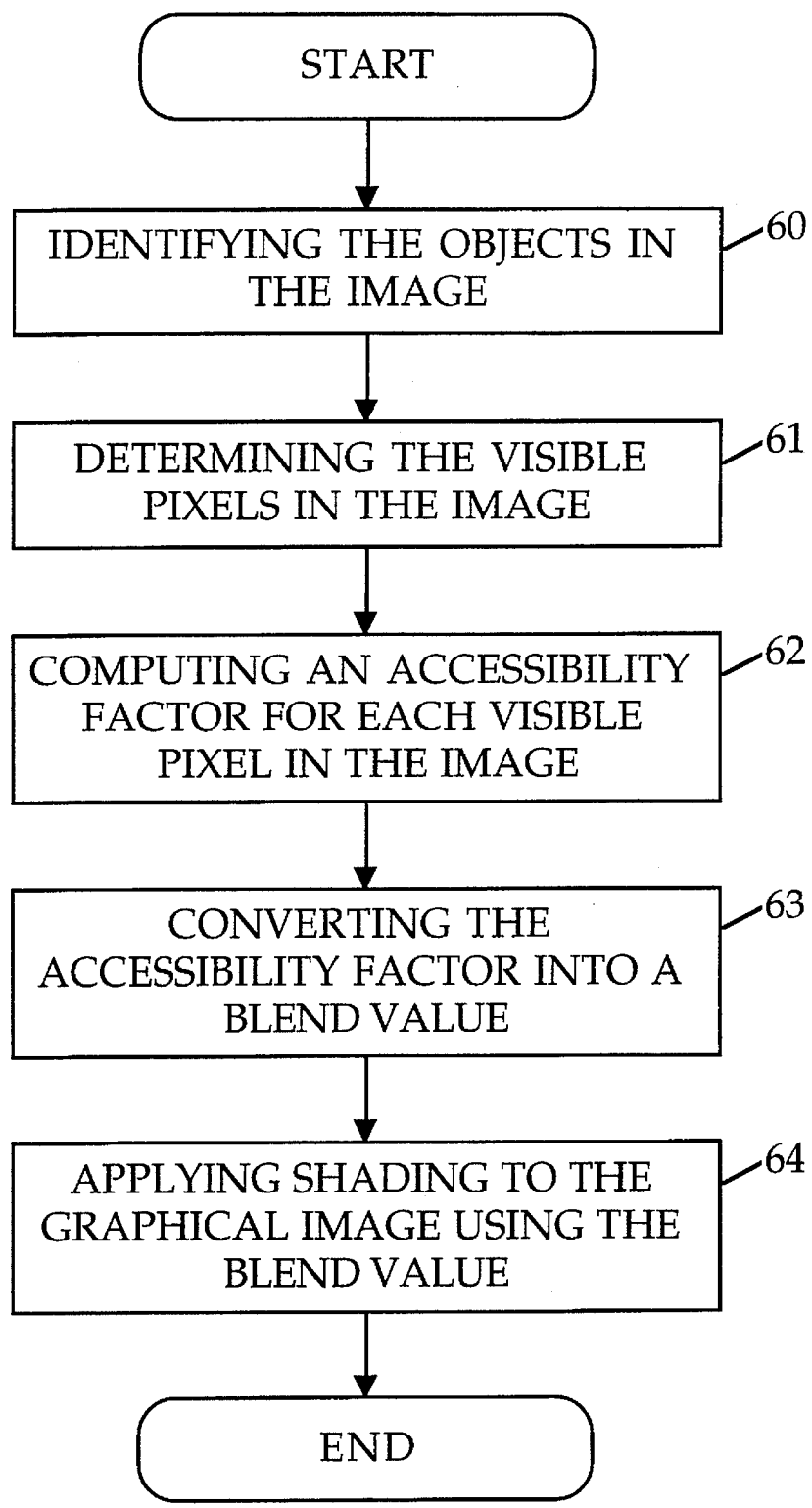
FIG. 4 is a flow chart of the preferred method for rendering a graphic computer image on the display device with shading according to the present invention.

Referring now to FIG. 4, an overview of the method steps of the present invention for rendering a graphic computer image on the display device 22 is shown. In computer graphics, each image comprises a series of objects that are defined using several primitives or image components such as spheres, polygons, cylinders, lines and planes. The method of the present invention begins in step 60 by identifying the objects that are in the image. Next, in step 61, the present invention determines which pixels will be visible on the display device 22. For example, when an image is displayed only a portion of the points forming the image and their corresponding pixels will be rendered on the display device 22 because of the angle, position and illumination at which the computer generated object is being viewed. Once the visible pixels have been identified, the method preferably determines an accessibility factor, as defined above and as will be described in more detail below, for each visible pixel in step 62. Each of the accessibility factors are then converted to a blend value in step 63. Finally, shading is applied to the object as it is rendered on the display device 22 using the blend value. The accessibility factor can be used with a variety of rendering techniques known in the art including scan-line and ray-tracing.

Figure 5:
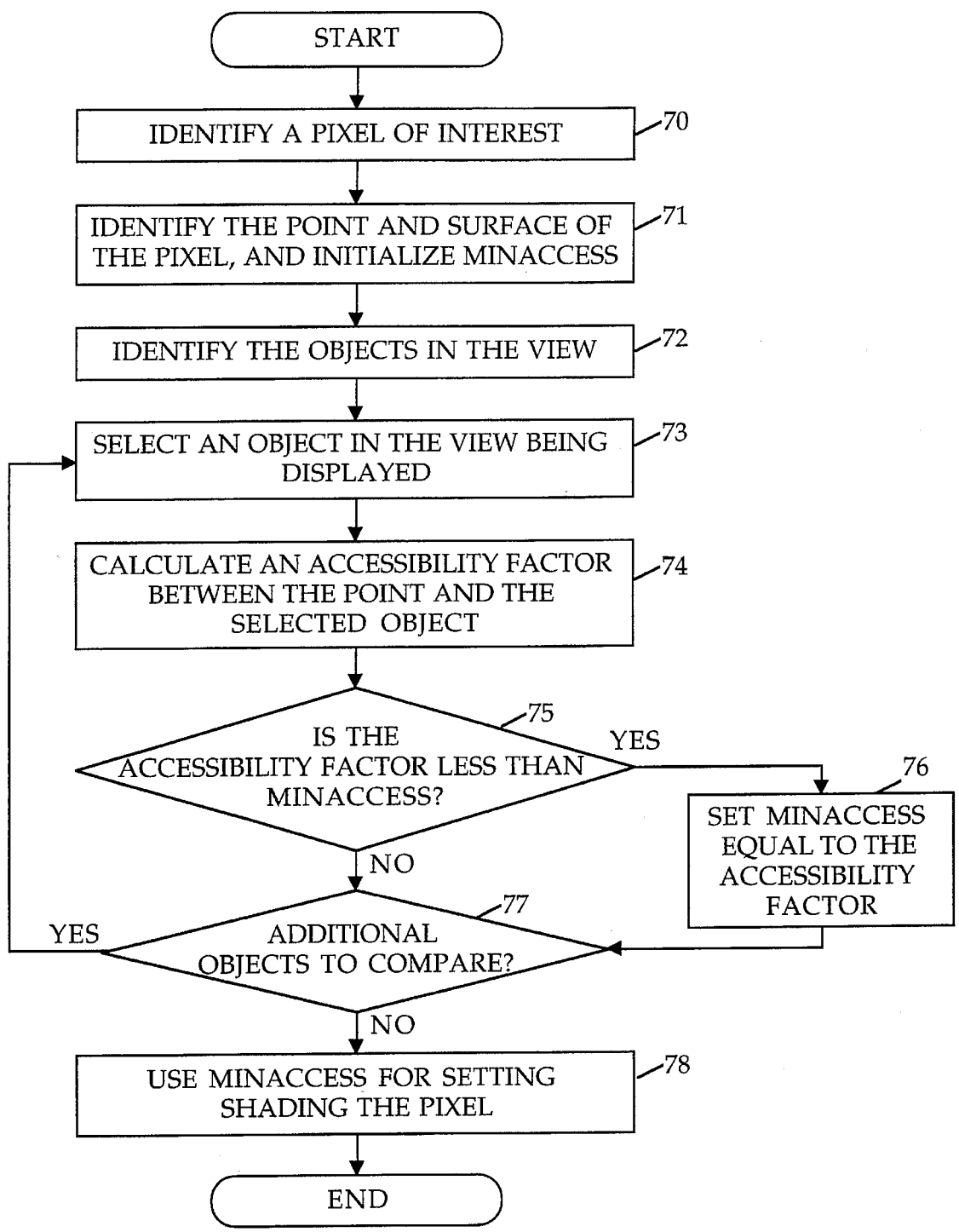
FIG. 5 is a flow chart of the preferred method for generating each shaded pixel of an image according to the present invention.

Referring now to FIG. 5, a preferred method for generating each shaded pixel of an image according to the present invention is shown. The method of the present invention advantageously determines the accessibility factor for the point of interest by considering the surface on which the point lies and one other object. This step is repeated for each object in the view until the smallest accessibility factor has been determined. The method begins in step 70 by identifying the pixel of interest. Next, in step 71, the method identifies a point of interest and a surface of the object corresponding in position to the pixel. The variable MINACCESS is also initialized to the greatest possible accessibility factor. Next, in step 72, the present invention identifies the objects or other surfaces that are within the view being rendered. The objects identified in step 72 include all objects in view except for the object upon which the point of interest lies. Then in step 73, the preferred method selects an object from those identified in step 72. In step 74, the preferred method calculates the accessibility factor for the point of interest in the presence of the selected object. Next, in step 75, the method determines whether the accessibility factor calculated in step 74 is less than the value stored in MINACCESS. If the accessibility factor calculated in step 74 is less than the value stored in MINACCESS, then the method continues in step 76 where MINACCESS is set equal to the accessibility factor calculated in step 74. Then the method proceeds to step 77. If the accessibility factor calculated in step 74 is determined not to be less than the value stored in MINACCESS in step 75, then the method proceeds directly to step 77. In step 77, the method determines whether there are additional objects in the view for which the accessibility factor has not been calculated. If there are, the method loops to step 73 to select another object and generate another accessibility factor. Finally, the smallest accessibility factor stored in MINACCESS is used in step 78 for setting the shading that will be applied to the pixel when it is rendered on the display device 22.

Figure 6A:
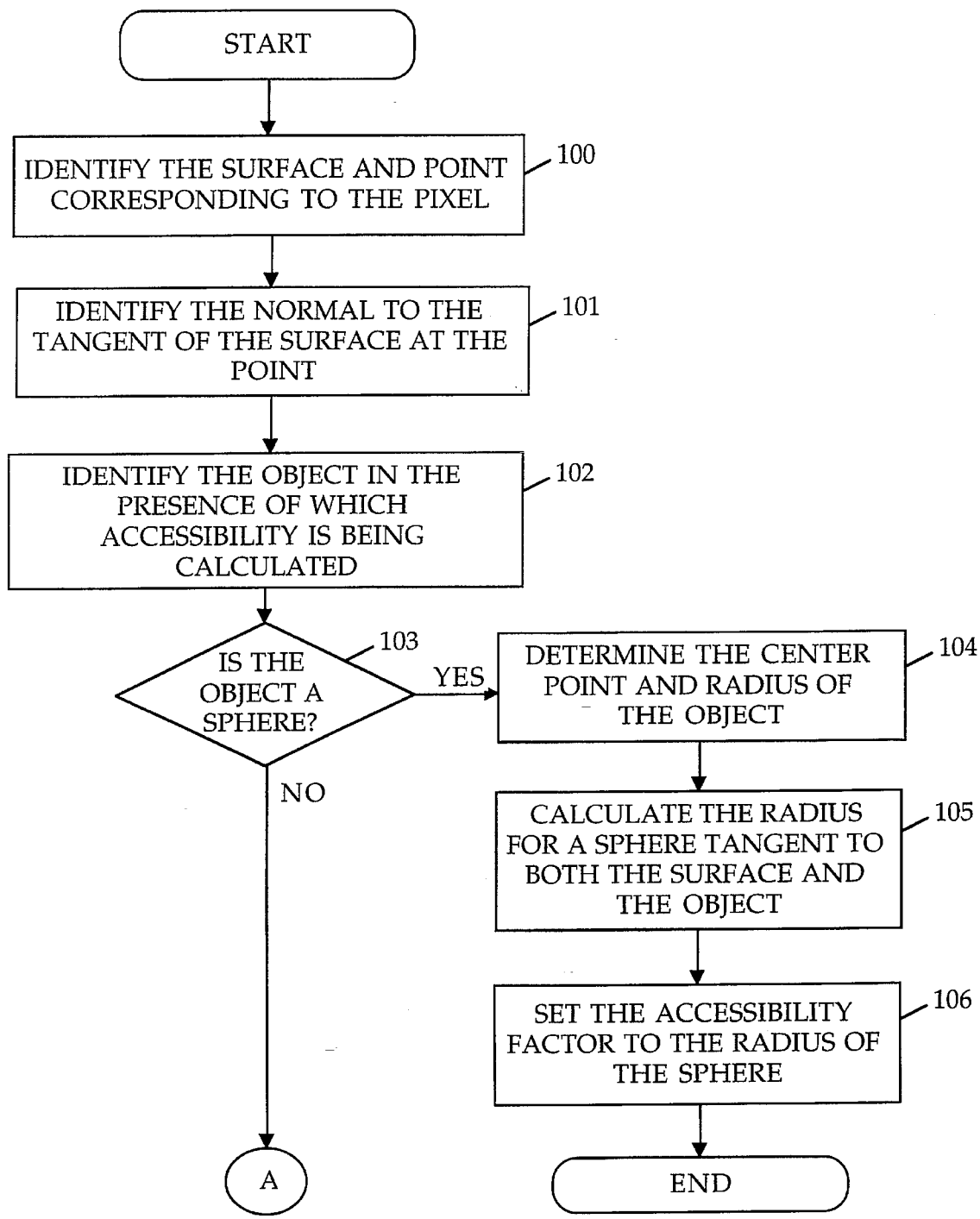
FIGS. 6A, 6B and 6C are a flow chart of the preferred method for producing the accessibility factor used to shade the pixel according to the present invention.
Figure 6B:
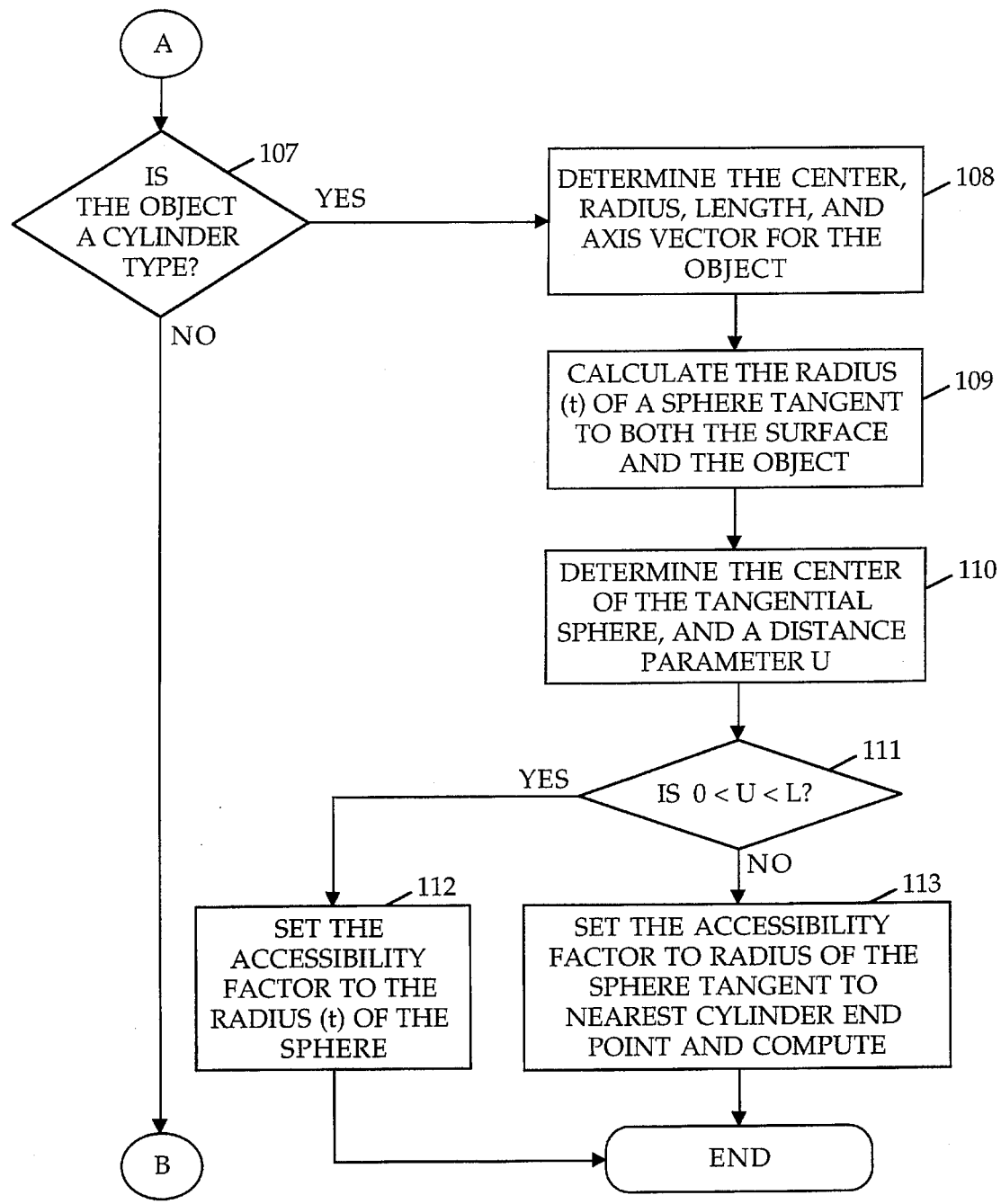
Figure 6C:
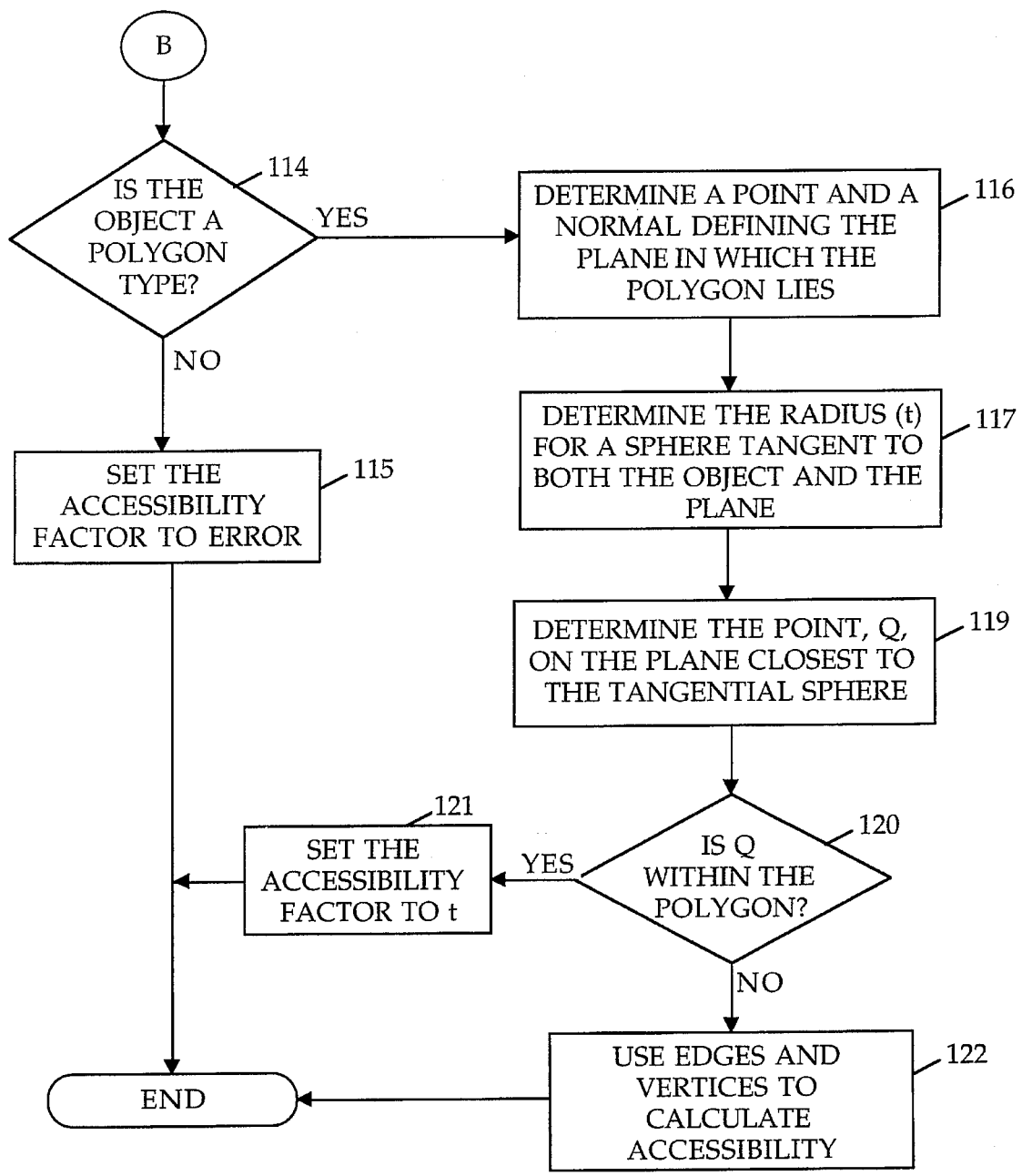

Referring now to FIGS. 6A, 6B and 6C, the process for determining an accessibility factor for a point on a surface in the presence of another object will be described in more detail. While the accessibility factor could be determined using an iterative process such as a sphere-object intersection, the method of the present invention advantageously determines the accessibility factor through direct calculation depending on the object's primitive type. In the preferred embodiment, the present invention provides three primitive types, namely spheres, cylinders and polygons. Depending on the type of primitive, the accessibility factor is determined in different ways. A flow chart of the preferred process for determining the accessibility factor for a given point, X, on a surface is shown by FIGS. 6A, 6B and 6C.

Figure 8:
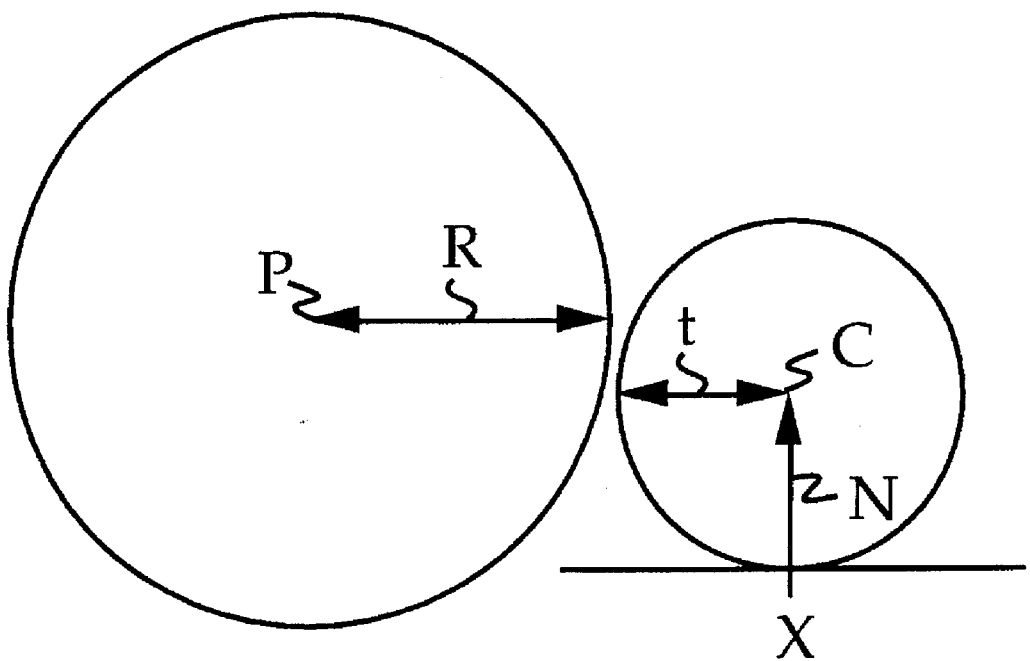
FIG. 8 is a diagram of a tangential sphere in the presence of another sphere and the parameters used in direct determination of the accessibility factor.

In step 100 of FIG. 6A, the preferred process begins by identifying the surface and a point, X, corresponding to the pixel that is being rendered. Next in step 101, the normal (N) to the tangent of the surface at point X is identified. In step 102, the method identifies the object in the presence of which accessibility is being calculated. Then in step 103, the method determines whether the object identified in step 102 is a sphere type primitive. If the object is identified as a sphere type primitive, the method proceeds to step 104 where the center point (P) and radius (R) of the object are determined. Then in step 105, the present invention advantageously determines accessibility by determining the radius of the largest possible sphere tangent to both the surface at point X and the object. The radius (t) of the tangential sphere is determined by direct calculation of:

$$t = \frac{R^2 - (X-P) \cdot (X-P)}{2(N \cdot (X-P) - R)}$$

where R is the radius of the object, P is the center point of the object, X is the point of interest, and N is the normal to the tangent of the surface at point X. The direct calculation of the radius (t) is more clearly illustrated with reference to FIG. 8. Next in step 106, the accessibility factor is set to be the radius of tangential sphere. However, if the value of t is less than zero, then the normal points away from the other sphere such that accessibility is actually infinite. In such cases, the accessibility factor is set to be the maximum value and the process is complete.

If the object is not identified as a sphere type primitive in step 103, then the method proceeds to step 107 of FIG. 6B. In step 107, the method then tests whether the object is a cylinder type primitive. In the present invention, cylinder types are assumed to be a cylinder with spherical end caps. Line segments are considered a special case of cylinders with a radius of zero in the present method. If the object is a cylinder type primitive, the method continues in step 108 and determines the center point (P), radius (R), a length (l), and an axis unit vector (L) of the object. Then in step 109, the present invention determines the radius (t) of the largest possible sphere tangent to both the surface at point X and the object. The radius (t) of the tangential sphere is determined by direct calculation of:

$$t = \frac{-2(R + V \cdot W) \pm (2(R + V \cdot W) - 4(1 - V \cdot V)(R^2 - W \cdot W))^{.5}}{2(1 - V \cdot V)} \; ;$$

where $V = N - (N \cdot L)L$, and $W = ((X-P) \cdot L) - (X-P)$. The present invention preferably uses the smallest positive value of t. If $(1 - V \cdot V)$ is very close to zero, then:

$$t = \frac{-(R^2 - W \cdot W)}{2(R + V \cdot W)} \; .$$

Figure 10A:
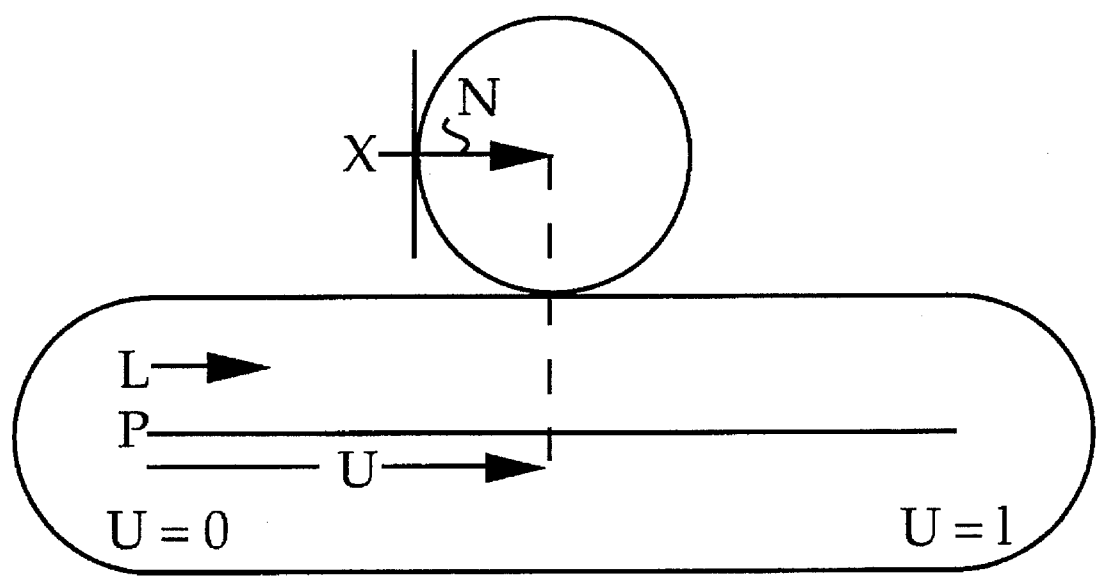
FIG. 10A is a diagram of a tangential sphere in the presence of a cylinder and the parameters used in direct determination of the accessibility factor where u is valid.
Figure 10B:
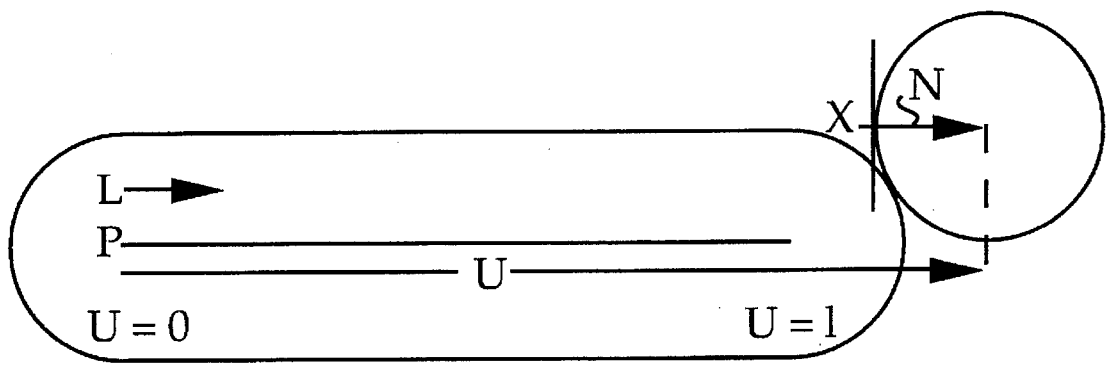
FIG. 10B is a diagram of a tangential sphere in the presence of a cylinder where u is not valid.

Thus far, the object has been treated as a cylinder of infinite length. For cylinders of finite length, the end points must be considered. To determine if the tangential sphere with radius t touches the object (a cylinder with spherical end caps), the computed value of t is used in step 110 to find the center of C of the tangential sphere using the equation: $C = X + tN$. Also in step 110, the distance parameter, u, along the axis of the cylinder is determined using the equation: $u = (C-P) \cdot L$. Then in step 111, the method determines if u is between the end points for the cylinder. In other words, u must be greater than zero and ($0 < u$), and u must be less than L ($u < L$), where L is the end of the line. The value of u is only valid if it is between the end points. If u is between zero and L, then the value of t is valid and used as the accessibility factor in step 112. This is geometrically shown in FIG. 10A. However, if u is not between zero and L, the value of t computed in step 109 is disregarded, and the radius of a sphere tangent to the nearest end of the cylinder and point X is computed and used as the accessibility factor in step 113. Such a determination can be made as has been described above where the nearest end point is considered a sphere of zero diameter. A diagram showing the geometry and the invalid value of u is shown in FIG. 10B.

Once the preferred method has determined that the object is not a sphere in step 103 and not a cylinder in step 107, the method tests whether the object is a polygon in step 114 as illustrated in FIG. 6C. If the method determines that the object is not a polygon, then an error has occurred, and the object is not a recognizable type. The method returns an error message in step 115 and the method for determining an accessibility factor ends without providing an accessibility value.

On the other hand, if the object is determined to be a planar convex polygon then method proceeds to step 116, where the preferred method identifies each side of the polygon. The method also determines a point P and a normal M that define the plane in which the polygon lies. Next in step 117, the method determines the radius (t) of a sphere tangent to the object at point X and tangent to the plane identified in step 116. The value of t can be determined using the equation:

$$t = \frac{(X - P) \cdot M}{(1 - N \cdot M)} \; .$$

Figure 9:
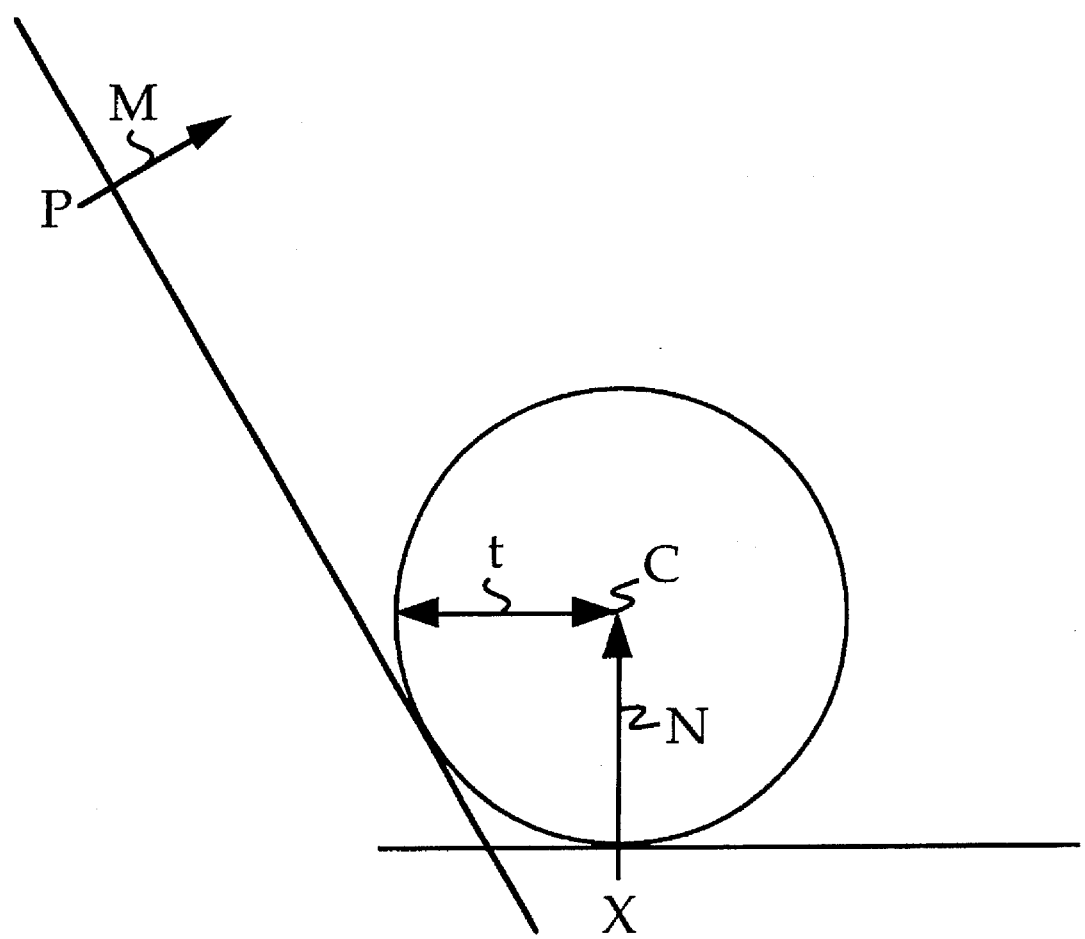
FIG. 9 is a diagram of a tangential sphere in the presence of a plane and the parameters used in direct determination of the accessibility factor.

Referring now to FIG. 9, a diagram showing the geometry for determining the radius of a sphere tangent to both an infinite plane and a point X is shown. Then in step 119, the value of t is used to compute the point Q, which is the point on the infinite plane which is closest to the center of the tangential sphere. Q is equal to $X + t(N-M)$. In step 120, the computed value of Q is then compared to the polygon corresponding to the plane to determine whether the point Q lies inside the polygon. If the point Q lies inside the polygon, the value of t used to calculate Q is used as the accessibility factor in step 121, and the method ends. However, if the point Q is outside the polygon, then the closest point on the polygon must either be an edge or one of the vertices. Then in step 122, each of the edges and vertices forming the polygon are used to compute a tangential radius with the vertices treated as spheres of zero radius and the edges treated as cylinders of zero radius. The smallest value of the tangential radius (t) produced by the computations of tangential radii for the vertices and the edges is then set as the accessibility factor in step 122 to complete the method.

The accessibility factor produced by the method of the present invention is a value that can range between zero and infinity. To use this accessibility factor as part of a shader, the present invention generates a blend value between zero and one from the accessibility factor. The blend value can be generated using a linear function, a polynomial function or a negative exponential function. In the preferred embodiment, the blend value is defined to be a linear ramp between two values for the accessibility factor called $R_0$ and $R_1$. $R_0$ is the smallest radius for the transition and $R_1$ is the largest radius. The linear ramp is preferably computed using the equation:

$$\beta = \frac{R_1 - t}{R_1 - R_0}$$

If t is greater than $R_1$, the value of $\beta$ set equal to zero. If t is less than $R_0$, then the value of $\beta$ is set equal to one. Thus, the value of $\beta$ increases in inaccessible regions. However, the above equation has a slope discontinuity when $R_1 = t$. The discontinuity can be eliminated by squaring $\beta$. A new blend value $\alpha$ is used as an alternative to $\beta$ to blend surface color and tarnish color for more realistic rendering with the following equations:

$$\alpha = \beta^2;$$

$$C_{Blend} = (1 - \alpha)C_{Surface} + \alpha C_{Tarnish};$$

Using the accessibility factor and the blend as described above produces completely white regions on the display for areas with greatest accessibility and completely black regions for areas with small accessibility. This advantageously emphasizes areas on intersection between objects displayed.

If there are more than two objects in the scene, the global accessibility is defined as the minimum of the accessibility factors produced for each of the other objects. It is equivalent to taking the minimum of the individual values of $\alpha$. However, computing the global accessibility by taking the minimum of the blend value for each of the primitives leads to a slope discontinuity. One method of the present invention for avoiding such slope discontinuities to compute the $\alpha$ values for each of the primitives and then combine them using multiplication rather than taking the minimum. This can be done using the equation:

$$\alpha_{Multi} = 1 - \prod_{\text{Each primitive}} (1 - \alpha_{Primitive}).$$

Using such a multiplicative scheme provides results that are smoother and more natural, however, two objects of the same shape that are made with a different number of component parts may have slightly different accessibility when the shading is applied.

Figure 7A:
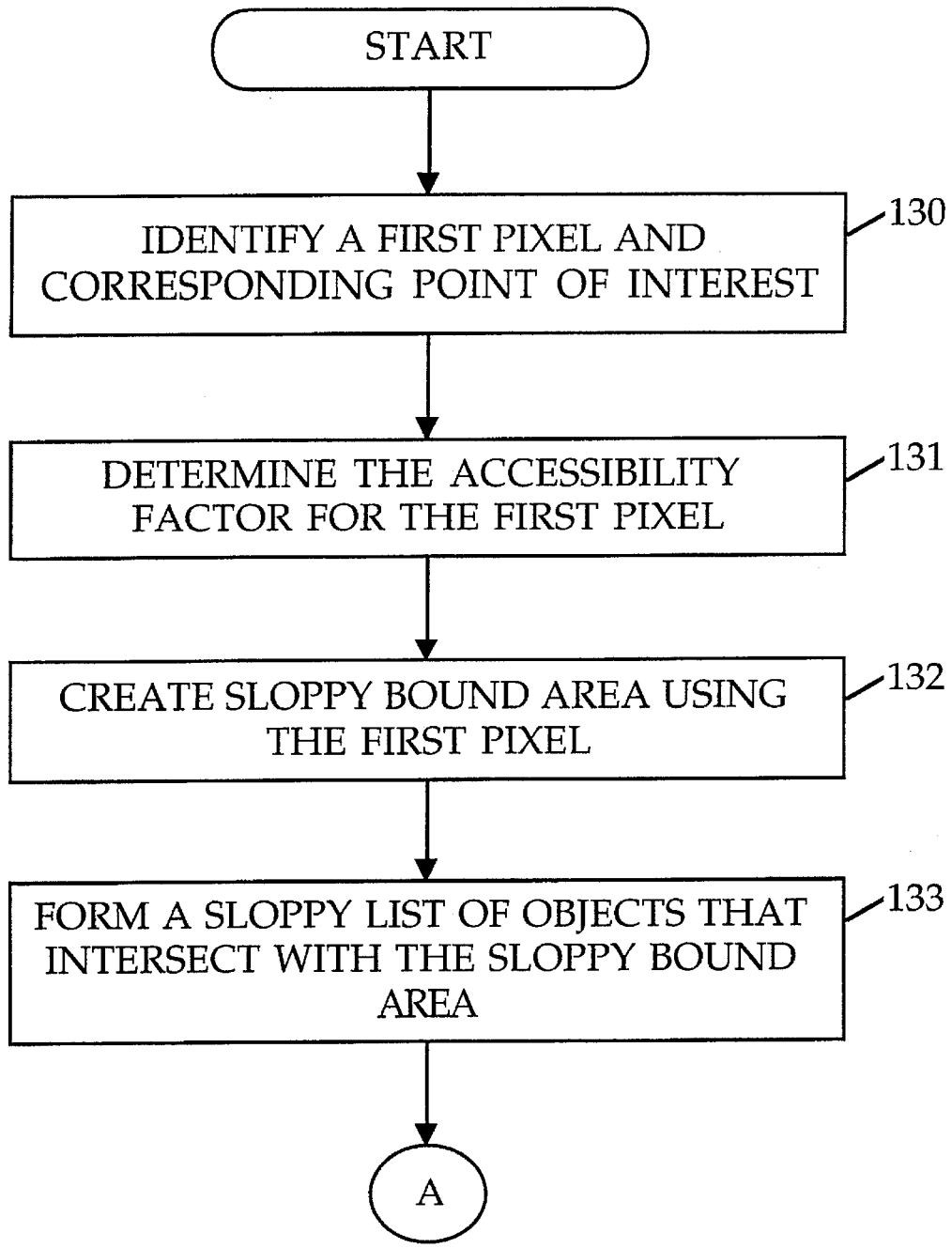
FIGS. 7A and 7B are a flow chart of the preferred method for optimizing the method for producing the accessibility factor.
Figure 7B:
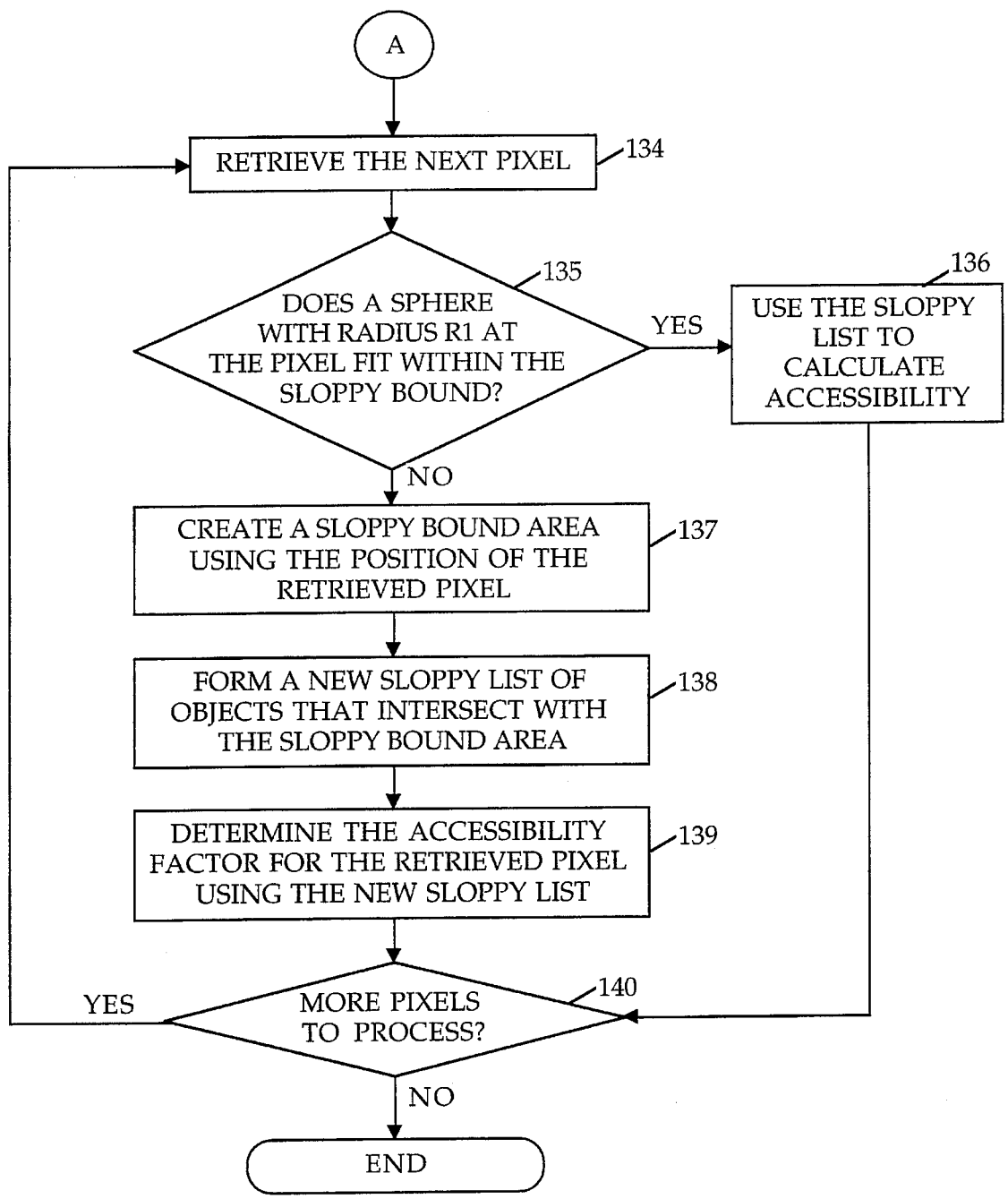

The present invention also includes a method for improving the computational efficiency of determining the accessibility factor. A flow chart of these steps is shown in FIG. 7. The present method applies pixel to pixel coherence where the results of the previous pixel are used to accelerate the computation of accessibility for the current pixel. The pixel to pixel coherence of the present invention can carry over from one scan-line to the next and even between different primitives. The method begins in step 130 by identifying a first pixel and its corresponding point and surface. Then in step 131, the method determines the accessibility factor for the first pixel according to the method described above. Next, in step 132, a sloppy bound area for the point corresponding to the first pixel is created. As has been noted above, some shaders only require knowledge of accessibility up to some maximum radius $R_1$. A sloppy bound radius ($R_s$) is defined to be the maximum radius $R_1$ plus a predetermined margin. The optimal value for the margin depends to some extent on the model and the resolution of the image being rendered. In an exemplary embodiment, the margin is a multiple of $R_1$ between 1 and 8. The present method uses the sloppy bound radius ($R_s$) to create the sloppy bound area which is defined by a tangential sphere with radius ($R_s$) at a point corresponding to the first pixel. For two adjacent pixels, tangential spheres with radius $R_1$ will overlap to a large degree and will both be included in the bounding box of size $2R_s$ on a side, the sloppy bound. For example, if the tangential sphere of maximum radius $R_1$ has a center ($C_x$, $C_y$, $C_z$), the sloppy bound is a bounding box defined by the points ($C_x-R_s$, $C_x+R_s$) in the x direction, the points ($C_y-R_s$, $C_y+R_s$) in the y direction and the points ($C_z-R_s$, $C_z+R_s$) in the z direction. The computation of accessibility can be performed by considering only the objects that overlap the sloppy bound as opposed to all the objects in the scene being rendered. Next in step 133, a sloppy list of objects that intersect with the sloppy bound area is created. This list advantageously limits the objects that need to be considered to determine accessibility to those objects used for the calculation of the previous pixel. In step 134, the next pixel for which accessibility must be determined is retrieved. Then in step 135, the method tests whether a sphere with the maximum radius $R_1$ and positioned tangential to the point of the next pixel fits within the sloppy bound area.

If the sphere of maximum radius for the next pixel fits in the sloppy bound, then the sloppy list of objects is used for determining the accessibility factor in step 136. The accessibility is determined as described above, however, accessibility is computed only for the objects in the sloppy list. The other objects in the image being rendered can be ignored since they are beyond the maximum radius and will not affect the determination of accessibility for this pixel. The method then proceeds to step 140 to test whether there are any additional pixels for which accessibility needs to be calculated. If there are more pixels to process, the method loops back to step 134 to get the next pixel. If there are not any more pixels to process, the method is complete.

If the sphere of maximum radius for the next pixel does not fit in the sloppy bound, in step 137 a new sloppy bound area for the point corresponding to the next pixel is created using a tangential sphere with radius $R_s$. In step 138, a new sloppy list of objects that intersect with the new sloppy bound area is also created. Then accessibility is determined in step 139 using the methods that have been described above. When determining the accessibility in step 139, only the new sloppy list of objects for the scene are considered. Finally, the method continues in step 140 to process more pixels. As before, the method returns to step 134 to get the next pixel if there are more pixels to process. Otherwise, there are no more pixels to process and the method ends.

While the present invention has been described with reference to certain preferred embodiments, those skilled in the art will recognize that various modifications may be provided. For example, there may be additional methods for calculating accessibility using tangential ellipsoids rather than tangential spheres. These and other variations upon and modifications to the preferred embodiment are provided for by the present invention which is limited only by the following claims.

What is claimed is:

1. A system for generating an accessibility factor, said accessibility factor being a value of a radius for a largest sphere that may touch a point (X) tangentially and that does not intersect with a surface upon which the point (X) lies or any other surfaces, for a pixel and using the accessibility factor to render the pixel, the system comprising:

a display device for displaying a plurality of pixels, the display device having an input;

an input device for inputting information to the system, the input device having an output;

a memory for storing data, the memory having inputs and outputs, the memory including a plurality of image components, means for generating the accessibility factor for a pixel, and means for generating a blend value from the accessibility factor to shade the pixel; and a processing unit for, controlling the accessibility factor generation means, the blend value generation means and processing of pixels to produce graphical images on the display device, the processing unit coupled to the display device, the input device, and the memory.

2. The system of claim 1, wherein the memory further comprises a parametric texture map for storing the accessibility factors, said parametric texture map storing the accessibility factors generated for reuse with other renderings of the image components.

3. The system of claim 1, wherein the plurality of image components include sphere, cylinder and rectangle primitives.

4. The system of claim 1, wherein the accessibility factor generation means comprises:

a means for generating at least one accessibility factor for each visible pixel in relation to each of the objects forming the image, the accessibility factor generation means having an input and an output, the input of the accessibility factor generation means coupled to receive the image components; and means for selecting the smallest accessibility factor as the accessibility factor, the selecting means having an input and an output, the input of the selecting means coupled to the output of the accessibility factor generation means.

5. The system of claim 1, wherein the blend value generation means comprises:

a first means for setting the blend value to $$\frac{R_1 - t}{R_1 - R_0}$$

if the accessibility factor (t) is between a minimum radius ($R_0$) and a maximum radius ($R_1$), equal to R0 or equal to R1;

a second means for setting the blend value to one if the accessibility factor is less than $R_0$; and a third means for setting the blend value to zero if the accessibility factor is greater than $R_1$.

6. A computer implemented method for shading graphic images for realistic rendering representative of tarnish accumulation, the method comprising the steps of:

identifying objects forming an image;

determining which pixels of the image are visible on a display device;

generating an accessibility factor, said accessibility factor being a value of a radius for a largest sphere that may touch a point (X) tangentially and that does not intersect with a surface upon which the point (X) lies or any other surfaces, for each visible pixel;

generating a blend value for each pixel using its respective accessibility factor; and shading each pixel as it is rendered on the display device by applying the blend value to image signals for the respective pixel.

7. The method of claim 6, wherein a plurality of primitives including spheres, cylinders, planes and polygons are used to represent objects, and the step of identifying the objects forming an image further comprises the step identifying the primitives forming each object.

8. The method of claim 6, wherein the step of determining which pixels of the image are visible on the display device includes the steps of determining a view and an illumination for rendering the object.

9. The method of claim 6, wherein the step of generating an accessibility factor for each visible pixel further comprises the steps of:

generating a separate accessibility factor for each visible pixel in relation to each of the objects forming the image; and selecting a smallest separate accessibility factor as the accessibility factor.

10. The method of claim 6, wherein the step of generating an accessibility factor for each visible pixel further comprises the steps of:

identifying a visible pixel;

identifying the point (X) and the surface corresponding to the visible pixel;

producing a separate accessibility factor for each object identified in the image in relation to the point;

determining a smallest separate accessibility factor yielded by the producing step; and using the smallest accessibility factor as the accessibility factor for the identified visible pixel.

11. The method of claim 10, wherein the objects identified exclude the object defined by the surface and the point.

12. The method of claim 10, wherein the step of determining the smallest accessibility factor from the producing step, further comprises the steps of:

initializing a variable MINACCESS for each different visible pixel;

comparing each produced accessibility factor to the value stored in MINACCESS; and setting MINACCESS to the produced accessibility factor if the produced accessibility factor is less than the current value stored in MINACCESS.

13. The method of claim 10, wherein the step of producing a separate accessibility factor further comprises the steps of:

identifying a normal (N) to a tangent of the surface at point (X):

identifying the object in relation to which the accessibility factor for point (X) is being calculated;

determining a primitive type of the object; and computing the radius of a sphere that is tangent to point (X), that does not intersect with the surface upon which point (X) lies and the surface of the object.

14. The method of claim 13, wherein the step of determining the primitive type of the object includes the step of testing whether the object is a sphere type; and if the object is determined to be a sphere type, the step of computing the radius of a sphere that is tangent further comprises the steps of:

determining the center point (P) and radius (R) of the object;

determining the radius (t) of the largest possible sphere tangent to both the surface at point X and the object by solving:

$$t = \frac{R^2 - (X-P) \cdot (X-P)}{2(N \cdot (X-P) - R)}$$

where R is the radius of the object, P is the center point of the object, X is the point of interest, and N is the normal to the tangent of the surface at point X; and setting the accessibility factor to be the radius (t) of the tangential sphere.

15. The method of claim 14, wherein the step of determining the primitive type of the object includes the step of testing whether the object is a cylinder type; and if the object is determined to be a cylinder, the step of computing the radius of a sphere that is tangent further comprises the steps of:

determining a center point (P) a radius (R), a length (l), and an axis unit vector (L) of the object;

determining the radius (t) of the largest possible sphere tangent to both the surface at point X and the object using the equation:

$$t = \frac{-2(R + V \cdot W) \pm (2(R + V \cdot W) - 4(1 - V \cdot V)(R^2 - W \cdot W))^{.5}}{2(1 - V \cdot V)};$$

where $V = N - (N \cdot L)L, W = ((X-P) \cdot L) - (X-P)$, R is the radius of the object, P is the center point of the object, X is the point of interest, and N is the normal to the tangent of the surface at point X; and setting the accessibility factor to be the smallest positive value of the radius (t) of the tangential sphere.

16. The method of claim 13, wherein the step of determining the primitive type of the object includes the step of testing whether the object is a cylinder type; and if the object is determined to be a cylinder, the step of computing the radius of a sphere that is tangent further comprises the steps of:

determining a center point (P) a radius (R), a length (l), and an axis unit vector (L) of the object;

determining the radius (t) of the largest possible sphere tangent to both the surface at point X and the object by solving:

$$t = \frac{-2(R + V \cdot W) \pm (2(R + V \cdot W) - 4(1 - V \cdot V)(R^2 - W \cdot W))^{.5}}{2(1 - V \cdot V)};$$

where $V = N - (N \cdot L)L$, $W = ((X-P) \cdot L) - (X-P)$, R is the radius of the object, P is the center point of one end of the object, X is the point of interest, and N is the normal to the tangent of the surface at point X; and setting the accessibility factor to be the smallest positive value of the radius (t) of the tangential sphere.

17. The method of claim 16, wherein the radius t equals $$\frac{-(R^2 - W \cdot W)}{2(R + V \cdot W)}$$

if (1–V·V) has a value close to zero.

18. The method of claim 16, wherein the step of computing the radius of a sphere that is tangent further comprises the steps of:

determining the center (C) of the tangential sphere by solving C=X+tN using the value of t from the step of determining the radius (t);

determining a distance parameter (u) along the axis of the cylinder by solving u=(C–P)·L;

testing whether the distance parameter u from the above determining step is less than or equal to zero, or greater than or equal to the cylinder length (l); and if distance parameter u is less than or equal to zero, or greater than or equal to the cylinder length l, setting t to be the radius of a sphere tangent to a second sphere with the same radius as the cylinder, the second sphere centered on an end point of the cylinder nearest to point X.

19. The method of claim 13, wherein the step of determining the primitive type of the object includes the step of testing whether the object is a polygon type; and if the object is determined to be a polygon type, the step of computing the radius of a sphere that is tangent further comprises the steps of:

identifying a point P and a normal M that define a plane in which a side lies for each side of the object;

determining the radius (t) of a sphere tangent to the object at point (X) and tangent to the plane for each of the planes identified, the radius (t) of a sphere tangent equal to $$\frac{(X - P) \cdot M}{(1 - N \cdot M)} ;$$

identifying the plane and side with the smallest tangential sphere;

finding the point Q on the identified plane that is closest to the center of the tangential sphere, using the radius (t) of the smallest tangential sphere identified where Q=X+t(N–M);

comparing the value of Q to the side of the object corresponding to the plane with the smallest tangential sphere to determine if the point is on the side of the object;

if the point is on the side of the object, using the value of t as the accessibility factor; and if the point is not on the side of the object, determining a tangential sphere for each edge and vertex of the side of the object, where the edges are treated as cylinders with zero radius and vertices are treated as spheres of zero radius, and then using the smallest value of the tangential radius (t) from these computations as the accessibility factor.

20. The method of claim 6, wherein the step of generating a blend value for each pixel using its respective accessibility factor further comprises the steps of:

setting the blend value to $$\frac{R_1 - t}{R_1 - R_0}$$

if the value of accessibility factor (t) is between a minimum radius ($R_0$) and a maximum radius ($R_1$), equal to R0 or equal to R1;

setting the blend value to one if the accessibility factor is less than $R_0$; and setting the blend value to zero if the accessibility factor is greater than $R_1$.

21. The method of claim 6, wherein the step of generating a blend value for each pixel using its respective accessibility factor further comprises the steps of:

the blend value is the square of $$\frac{R_1 - t}{R_1 - R_0}$$

if the value of the accessibility factor (t) is between a minimum radius (R0) and a maximum radius (R1), equal to R0 or equal to R1;

the blend value is one if the accessibility factor is less than $R_0$; and the blend value is zero if the accessibility factor is greater than $R_1$.

22. A computer implemented method for improving the computational efficiency of determining an accessibility factor, said accessibility factor being a value of a radius for a largest sphere that may touch a point (X) tangentially and that does not intersect with a surface upon which the point (X) lies or any other surfaces, for a plurality of pixels to be generated on a display device, the pixels representing one or more objects on the display device, the method comprising the steps of:

identifying a first pixel and its corresponding point and surface;

determining the accessibility factor for the first pixel;

creating a sloppy bound for the point corresponding to the first pixel, the sloppy bound being greater than a maximum radius (R1);

creating a sloppy list of objects that intersect with the sloppy bound;

retrieving a second pixel and its corresponding point and surface for which accessibility needs to be determined;

determining whether a tangential sphere with the maximum radius $R_1$ and positioned tangential to the point of the second pixel fits within the sloppy bound; and if the tangential sphere with the maximum radius $R_1$ fits within the sloppy bound, then the accessibility factor is calculated by only considering the objects in the sloppy list.

23. The method of claim 22, wherein the sloppy bound is defined to be a cube having the length of each side equal to a multiple of the maximum radius (R1), the multiple having a value of between one and eight.

24. The method of claim 22, wherein the sloppy bound is defined to be a cube having the length of each side equal to the maximum radius (R1) plus a predetermined amount.

25. The method of claim 22, wherein if the tangential sphere with the maximum radius ($R_1$) does not fit within in the sloppy bound, then the method further comprises the step of:

creating a sloppy bound for the point corresponding to the next pixel, the sloppy bound greater than a maximum radius (R1):

creating a sloppy list of objects that intersect with the new sloppy bound; and determining the accessibility factor by only considering the objects in the new sloppy list.

26. An apparatus for shading graphic images for realistic rendering representative of tarnish accumulation on a display device, the apparatus comprising:

first means for identifying objects forming an image, the first identifying means having an input and an output, the input of the first identifying means coupled to receive objects forming at least one image;

means for determining the visible pixels of the image on the display device, the determining means having an input and an output, the input of the determining means coupled to the output of the first identifying means;

means for generating an accessibility factor, said accessibility factor being a value of a radius for a largest sphere that may touch a point (X) tangentially and that does not intersect with a surface upon which the point (X) lies or any other surfaces, for each visible pixel, the generating means having an input and an output, the input of the generating means coupled to the output of the determining means;

means for producing a blend value for each pixel using its respective accessibility factor, the producing means having an input and an output, the input of the producing means coupled to the output of the generating means; and means for shading each pixel as it is rendered on the display device by applying the blend value to the respective pixel, the shading means having a first input, a second input and an output, the first input of the shading means coupled to the output of the producing means, and the second input of the shading means coupled to receive the image.

27. The apparatus of claim 26, wherein the generating means comprises:

a means for selecting a visible pixel having an input and an output, the input of the visible pixel selection means coupled to the output of the determining means;

a second means for identifying the point (X) and the surface corresponding to a selected visible pixel, the second identifying means having an input and an output, the input of the second identifying means coupled to the output of the visible pixel selection means;

a third means for identifying objects in a view, the third identifying means having an input and an output, the input of the third identifying means coupled to the output of the second identifying means;

a second means for producing an accessibility factor for each object identified in the view, the accessibility factor being generated for the point in the presence of the identified object, the second producing means having a first input, a second input, and a third input, the first input of the second producing means coupled to the output of the visible pixel selection means, the second input of the second producing means coupled to the output of the second identifying means, and the third input of the second producing means coupled the output of the third identifying means; and a second means for determining a smallest accessibility factor output by the second producing means, the second determining means having an input and an output, the input of the second determining means coupled to the output of the second producing means.

28. The apparatus of claim 27, wherein the second producing means further comprises:

a fourth means for identifying a normal (N) to a tangent of the surface at point (X), the fourth identifying means having an input and an output, the input of the fourth identifying means coupled to the output of the second identifying means;

a fifth means for identifying an object in the presence of which the accessibility factor for point (X) is being calculated, the fifth identifying means having an input and an output, the input of the fifth identifying means coupled to the output of the third identifying means; and means for computing the radius of a sphere that is tangent to point (X) and that does not intersect with the surface upon which point (X) lies and the surface of the object identified by the fifth identifying means, the computing means having a first input, a second input, and an output, the first input of the computing means coupled to the output of the fourth identifying means, and the second input of the computing means coupled to the output of the fifth identifying means.

29. The apparatus of claim 28, further comprising:

a third means for determining a primitive type of the object, the third determining means having an input and an output, the input of the third determining means coupled to the output of the fifth identifying means;

means for testing whether the object is a sphere type, the testing means having an input and an output, the input of the testing means coupled to the output of the third determining means; and wherein the computing means determines a center point (P) and a radius (R) of the object and determines the radius (t) of the largest possible sphere tangent to both the surface at point (X) and the object by solving the equation $$t = \frac{R^2 - (X-P) \cdot (X-P)}{2(N \cdot (X-P) - R)}$$

where R is the radius of the object, P is the center point of the object, X is the point of interest, and N is the normal to the tangent of the surface at point (X).

30. The apparatus of claim 28, further comprising:

a third means for determining a primitive type of the object, the third determining means having an input and an output, the input of the third determining means coupled to the output of the fifth identifying means;

means for testing whether the object is a cylinder type, the testing means having an input and an output, the input of the testing means coupled to the output of the third determining means; and wherein the computing means determines a center point (P), a radius (R), a length (l), and an axis unit vector (L) of the object, and determines the radius (t) of the largest possible sphere tangent to both the surface at point (X) and the object by solving:

$$t = \frac{-2(R + V \cdot W) \pm (2(R + V \cdot W) - 4(1 - V \cdot V)(R^2 - W \cdot W))^{.5}}{2(1 - V \cdot V)};$$

where V=N−(N·L)L, W=((X−P)·L)−(X−P), R is the radius of the object, P is the center point of one end of the object, X is the point of interest, and N is a normal to the tangent of the surface at point (X).

31. The apparatus of claim 28, further comprising:

a third means for determining a primitive type of the object, the third determining means having an input and an output, the input of the third determining means coupled to the output of the fifth identifying means;

means for testing whether the object is a polygon type, the testing means having an input and an output, the input of the testing means coupled to the output of the third determining means; and wherein the computing means determines the radius (t) of a sphere tangent to the object at point (X) and tangent to the plane in which the polygon lies, the radius (t) of a sphere tangent equal to $$\frac{(X-P) \cdot M}{(1 - N \cdot M)}$$

where P is a point and M is a normal defining the plane in which the polygon lies.

32. A system for improving the computational efficiency of determining an accessibility factor, said accessibility factor being a value of a radius for a largest sphere that may touch a point (X) tangentially and that does not intersect with a surface upon which the point (X) lies or any other surfaces, for a plurality of pixels to be generated on a display device, the pixels representing one or more objects on the display device, the system comprising:

means for identifying a first pixel and its corresponding point and surface;

a first means for determining the accessibility factor for the first pixel;

means for creating a sloppy bound for the point corresponding to the first pixel, the sloppy bound being greater than a maximum radius (R1);

means for storing a sloppy list of objects that intersect with the sloppy bound;

means for retrieving a next pixel and its corresponding point and surface for which accessibility needs to be determined;

a second means for determining whether a tangential sphere with the maximum radius ($R_1$) and positioned tangential to the point of the next pixel fits within the sloppy bound; and means for calculating the accessibility factor by only considering the objects in the sloppy list if the tangential sphere with the maximum radius ($R_1$) fits within the sloppy bound.

* * * * *